(12) United States Patent
Kiyose

(10) Patent No.: US 8,147,115 B2
(45) Date of Patent: Apr. 3, 2012

(54) ELECTRO-OPTICAL DEVICE AND ELECTRONIC APPARATUS

(75) Inventor: Kanechika Kiyose, Matsumoto (JP)

(73) Assignee: Sony Corporation, Tokyo (JP)

( * ) Notice: Subject to any disclaimer, the term of this patent is extended or adjusted under 35 U.S.C. 154(b) by 462 days.

(21) Appl. No.: 12/499,940

(22) Filed: Jul. 9, 2009

(65) Prior Publication Data
US 2010/0053936 A1 Mar. 4, 2010

(30) Foreign Application Priority Data

Sep. 3, 2008 (JP) .................................. 2008-225601

(51) Int. Cl.
*F21V 7/04* (2006.01)
(52) U.S. Cl. ...... 362/633; 362/97.1; 362/97.2; 362/632; 362/634; 349/58
(58) Field of Classification Search ............. 349/58–60; 362/97.1–97.3, 632–634
See application file for complete search history.

(56) References Cited

U.S. PATENT DOCUMENTS
5,739,880 A * 4/1998 Suzuki et al. ................... 349/58
7,182,500 B2 * 2/2007 Sugawara ...................... 362/634

FOREIGN PATENT DOCUMENTS
JP 2007323016 12/2007
* cited by examiner

*Primary Examiner* — Stephen F Husar
(74) *Attorney, Agent, or Firm* — K&L Gates LLP

(57) ABSTRACT

An electro-optical device includes an electro-optical panel, a lighting unit that is disposed to overlap with the electro-optical panel in a plan view and that irradiates the electro-optical panel, and a frame-shaped holding member that has an adhesive layer for holding the electro-optical panel and the lighting unit. The holding member is provided at an outer peripheral end surface of the electro-optical panel and an outer peripheral end surface of the lighting unit, and fixes the electro-optical panel and the lighting unit.

7 Claims, 8 Drawing Sheets

ELECTRO-OPTICAL DEVICE AND ELECTRONIC APPARATUS

BACKGROUND

1. Technical Field

The present invention relates to an electro-optical device and an electronic apparatus, and more particularly, to a holding structure suitable for holding an electro-optical panel with a lighting unit.

2. Related Art

Generally, as an electro-optical device such as a liquid crystal display device mounted on an electric apparatus such as a mobile phone, an electro-optical device having a structure of holding a liquid crystal display panel and a lighting unit (back light) in a frame body (frame) made of synthetic resin is known. The frame body has a function of protecting the liquid crystal display panel, and a function of holding the liquid crystal display panel and the lighting unit illuminating the liquid crystal display panel integrally.

However, in the above-described structure, it is necessary to accommodate and hold the liquid crystal display panel and the lighting unit in the frame body. Accordingly, a frame area provided outside a display area of the liquid crystal display panel becomes large, and thus it is difficult to reduce the size of the electronic apparatus, and the design of the electronic apparatus is restricted.

For this reason, recently, the width of the frame body has been reduced to reduce the size of an outward form of a product, but there is a limit. Thus, the following structure has been proposed. For example, as described in JP-A-2007-323016, a projecting portion 41 is provided at a part of a holder 4 for holding a liquid crystal display panel, and the projecting portion 41 is engaged with a notch 71 provided in a frame 7 for accommodating the holder 4, thereby using the projecting portion 41 as a horizontal stopper. Accordingly, an engagement space is unnecessary at the time of assembling the frame and the holder, thereby reducing the size of the outward form.

In the structure described in the example, the engagement space is unnecessary at the time of accommodating the holder for holding the liquid crystal display panel in the frame, thereby reducing the width of the frame body including the holder and the frame. Accordingly, it is difficult to drastically reduce the width of the frame body itself, and it is difficult to sufficiently reduce the size of the outward form of the product.

SUMMARY

An advantage of some aspect of the invention is to provide an electro-optical device capable of drastically reducing the size of an outward form of a product by modifying the holding structure of a frame.

According to an aspect of the invention, there is provided an electro-optical device including: an electro-optical panel; a lighting unit that is disposed to overlap with the electro-optical panel in a plan view and that irradiates the electro-optical panel; and a frame-shaped holding member that has an adhesive layer for holding the electro-optical panel and the lighting unit, wherein the holding member is provided at an outer peripheral end surface of the electro-optical panel and an outer peripheral end surface of the lighting unit, and fixes the electro-optical panel and the lighting unit.

With such a configuration, the holding member is provided at both the outer peripheral end surface of the electro-optical panel and the outer peripheral end surface of the lighting unit, and fixes the electro-optical panel and the lighting unit, thereby holding the electro-optical panel and the lighting unit in a thickness direction. Preferably, the adhesive layer is disposed from the outer peripheral end surface of the electro-optical panel to the outer peripheral end surface of the lighting unit. In this case, the adhesive layer comes into close contact with the outer peripheral end surface, and the thickness of the adhesive layer is sufficiently small. Accordingly, it is possible to reduce outward projection, and thus it is possible to make the outward form of the electro-optical device compact.

In this case, it is preferable that the adhesive layer has a light shielding property. With such a configuration, light is prevented from leaking around, in addition to the above-described effect.

In the electro-optical device, it is preferable that the adhesive layer is formed of a tape. With such a configuration, it is possible to easily configure the holding member simply by adhering the tape to the outer peripheral end surface.

In the electro-optical device, it is preferable that the holding member includes the adhesive layer and a holding frame constituting a part of a frame. With such a combination, it is possible to improve the rigidity of the holding member.

In the electro-optical device, it is preferable that the adhesive layer is formed of a tape, and the tape is disposed from an end surface of the holding frame to the outer peripheral end surface of the electro-optical panel and the outer peripheral end surface of the lighting unit. With such a configuration, it is possible to improve the rigidity of the holding member.

In the electro-optical device, it is preferable that the lighting unit includes an optical sheet disposed between a light guide plate and the electro-optical panel, the adhesive layer is disposed from the outer peripheral end surface of the electro-optical panel to an outer peripheral end surface of the optical sheet. With such a configuration, it is possible to minimize the outward form of the lighting unit. In addition, the light guide plate is configured thicker than a reflective sheet or an optical sheet, and thus it is possible to sufficiently secure an adhering area to the adhesive layer. Accordingly, it is possible to improve the rigidity of the holding member.

According to another aspect of the invention, there is provided an electronic apparatus including: the electro-optical device according to Claim 1; and a control unit for controlling the electro-optical device. The electronic apparatus is not limited, but the electronic apparatus can be used effectively for a mobile phone, a portable electronic watch, a mobile information terminal, and the like, from the viewpoint in that the outward form of the electro-optical device can be configured to be small.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the accompanying drawings.

First Embodiment

Figure 1:
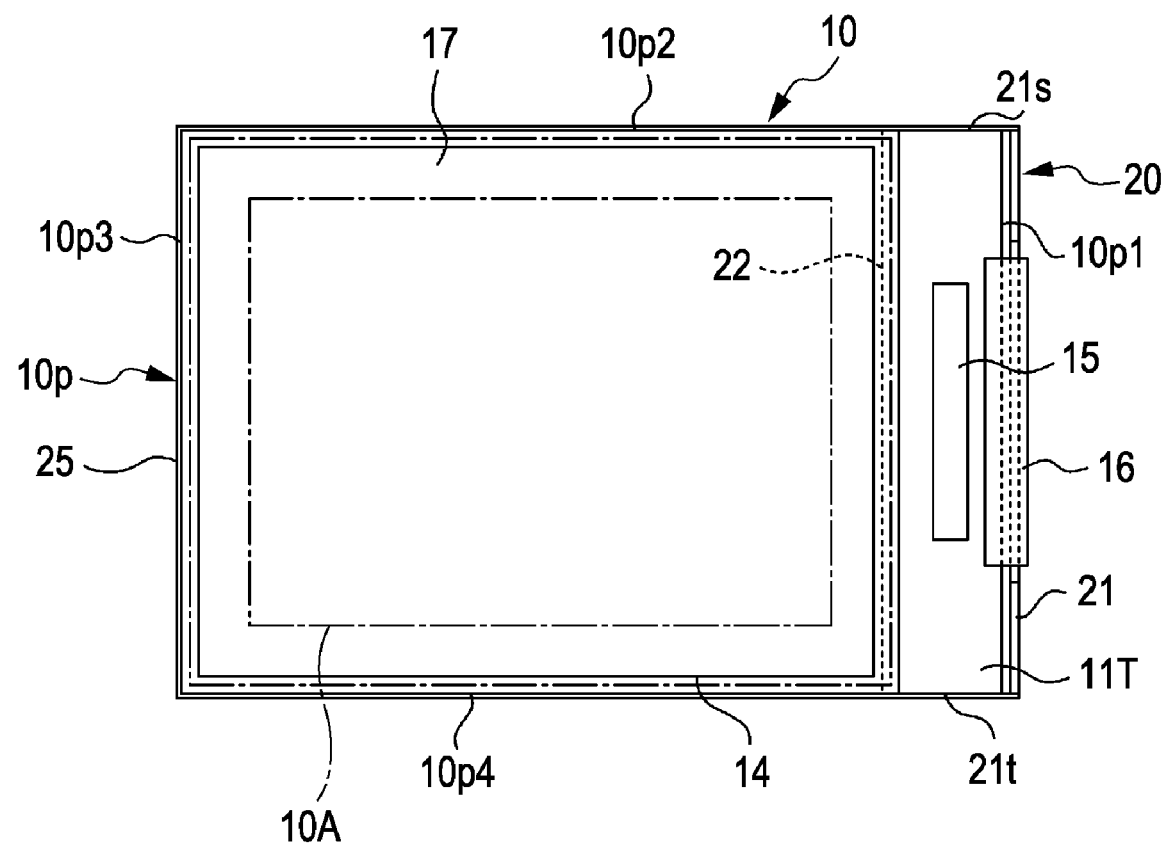
FIG. 1 is a plan view of an electro-optical device according to a first embodiment.
Figure 2A:
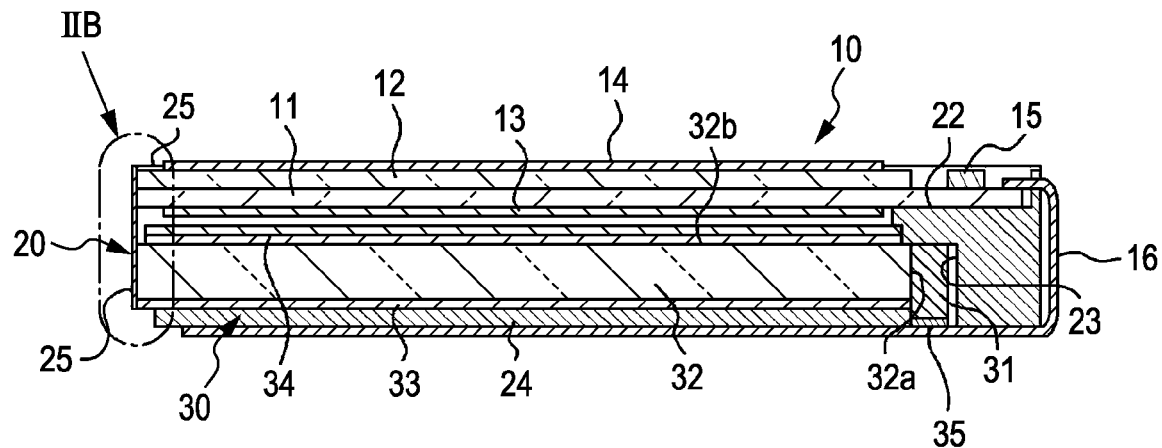
FIG. 2A is a longitudinal cross-sectional view of the first embodiment.
Figure 2B:
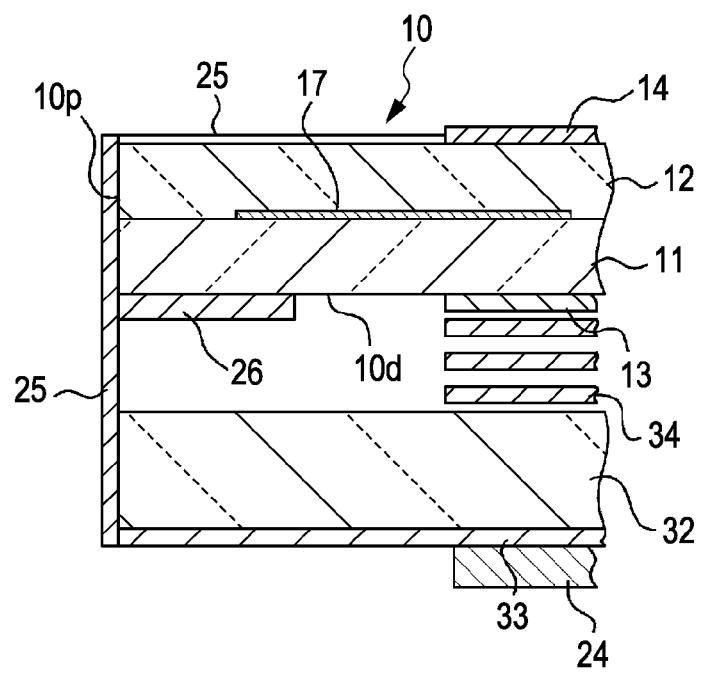
FIG. 2B is a partially enlarged longitudinal cross-sectional view of the first embodiment.
Figure 3:
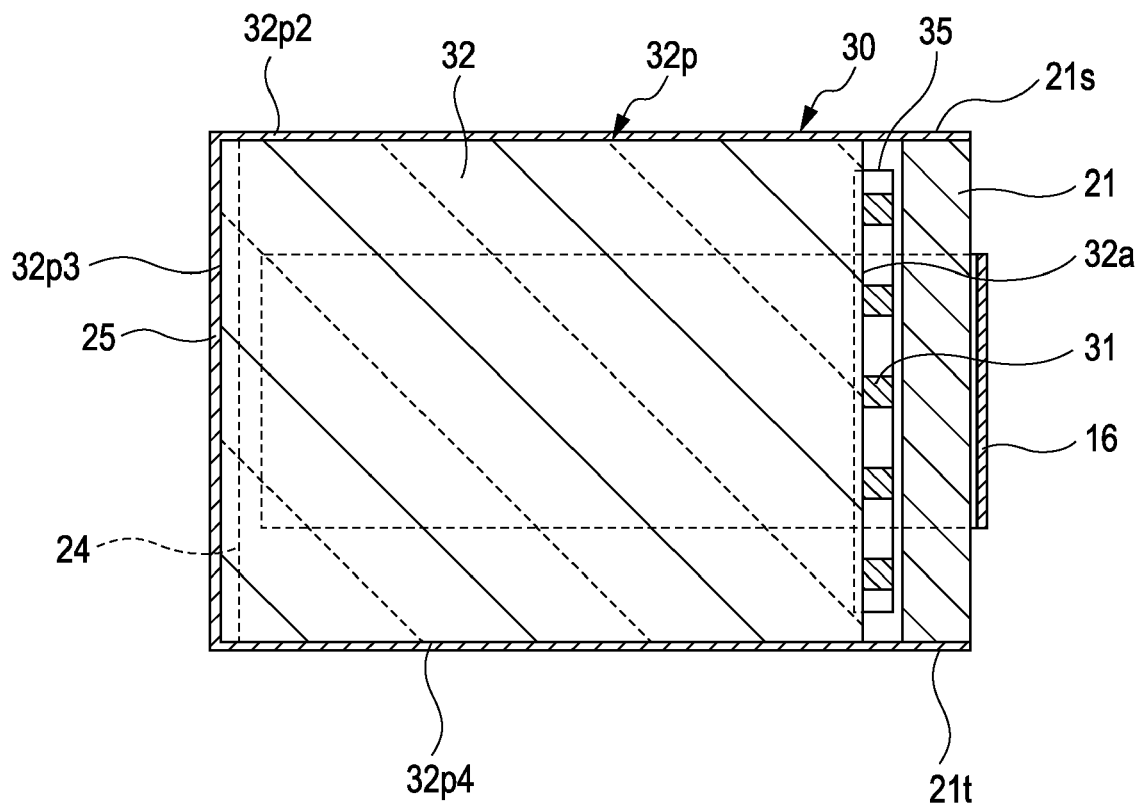
FIG. 3 is a transverse cross-sectional view of the first embodiment.
Figure 4:
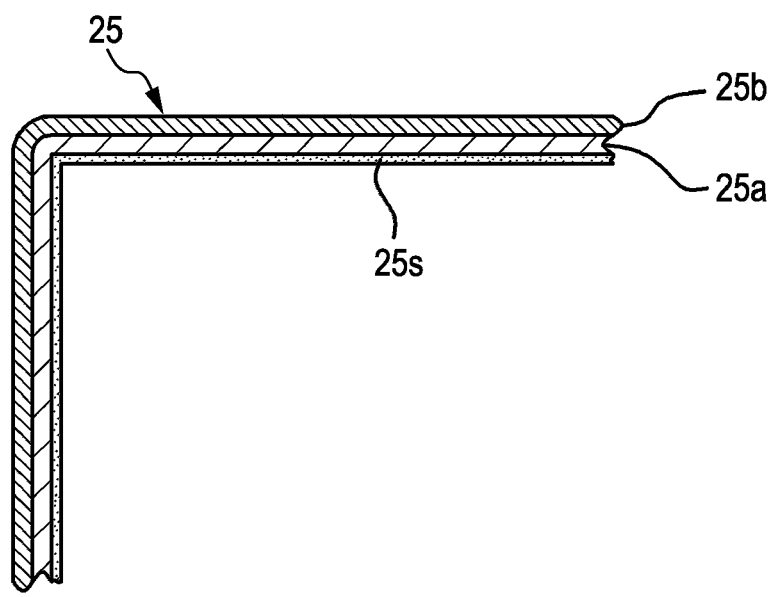
FIG. 4 is a partially enlarged transverse cross-sectional view of a holding tape.

FIG. 1 is a plan view of a first embodiment of an electro-optical device according to the invention, FIG. 2A is a schematic longitudinal cross-sectional view of the first embodiment, FIG. 2B is a partially enlarged longitudinal cross-sectional view illustrating an area IIB shown in FIG. 2A, FIG. 3 is a transverse cross-sectional view illustrating a transverse cross section of an accommodating part of a lighting unit according to the first embodiment, and FIG. 4 is a partially enlarged transverse cross-section view of a holding tape.

An electro-optical device according to the embodiment includes an electro-optical panel 10 formed of a liquid crystal display panel or the like, a lighting unit 30 disposed to overlap with the electro-optical panel 10 in a plan view and disposed at the rear of the opposite side to a visible side of the electro-optical panel 10 in the case of the shown example, and a frame body 20 as a holding member fixing and holding the electro-optical panel 10 and the lighting unit 30.

As shown in FIG. 1, FIG. 2A, and FIG. 2B, the electro-optical panel 10 has the following configuration. That is, transparent substrates 11 and 12 formed of glass or the like are adhered and coupled by a sealing material (not shown) or the like, a gap between the substrates 11 and 12 is filled to be air-tightly with an electro-optical material such as liquid crystal (not shown), and the outward form of the electro-optical panel 10 is rectangular. The electro-optical panel 10 has a display area 10A formed as a rectangular area except for an outer peripheral portion of the electro-optical panel 10. A light shield film 17 is formed on an outer peripheral side of the display area 10A. In the shown example, an example of a liquid crystal display panel is shown, and polarizing plates 13 and 14 are adhered to the outer surfaces of the substrates 11 and 12, respectively. The substrate 11 is provided with a substrate projecting portion 11T projecting toward the outside of the outward form of the substrate 12. Wiring is drawn out of the inside of the display area 10A, and a driving circuit 15 formed of a semiconductor IC chip or the like is mounted on the substrate projecting portion 11T. A wiring board 16 formed of a flexible printed circuit (FPC) or the like is mounted on the substrate projecting portion 11T, and the wiring board 16 is drawn out of the upside of the substrate projecting portion 11T in a thickness direction and extends to the rear (opposite side to the electro-optical panel 10) of the lighting unit 30.

An outer peripheral end surface 10P of the electro-optical panel 10 is formed of end surfaces of the substrates 11 and 12, and has an outer peripheral end surface portion 10p1 that is an end surface of a side formed of an outer edge of the substrate projecting portion 11T, outer peripheral end surface portions 10p2 and 10p4 that are end surfaces of sides adjacent thereto, and an outer peripheral end surface portion 10p3 opposed to the outer peripheral end surface portion 10p1.

The lighting unit 30 has a light source 31 formed of an LED or the like, a plate-shaped light guide plate 32 provided with a light incident surface 32a formed of an end surface opposed to a light emitting surface of the light source 31 and a light outgoing surface 32b formed of a surface intersecting (perpendicular to) the light incident surface 32a and being toward the electro-optical panel 10, a reflective sheet 33 disposed at the rear (opposite side to the electro-optical panel 10) of the light guide plate 32, and one or more optical sheets 34 (e.g., light diffusion sheet, prism sheet, etc.) disposed between the light outgoing surface 32b and the electro-optical panel 10.

As shown in FIG. 3, the lighting unit 30 has a lighting range having a rectangular shape in a plan view coinciding with a plane shape of the light outgoing surface 32b of the light guide plate 32, an outer peripheral end surface of the light range is formed of the outer peripheral end surface 32 of the light guide plate 32. The outer peripheral end surface 32 of the light guide plate 32 includes four outer peripheral end surface portions 32p1, 32p2, 32p3, and 32p4 of the rectangular light guide plate 32 in a plan view, and the outer peripheral end surface portion 32p1 is formed of the light incident surface 32a that is an end surface of a side corresponding to the outer peripheral end surface 10p1 of the electro-optical panel 10.

The frame body 20 has a holding frame 21 constituting a part of a frame formed along the outer peripheral end surface portion 10p1 of the side that is the outer edge of the substrate projecting portion 11T of the electro-optical panel 10, and a light-shielding holding tape 25 provided with an end portion adhered to both end surfaces 21s and 21t of the holding frame 21.

The holding frame 21 is not particularly limited, but is preferably formed of synthetic resin such as white polyethylene. The holding frame 21 has a flat supporting surface 22 that supports the electro-optical panel 10 from the rear (opposite side to the visible side) to expose it toward the upside (visible side). An accommodating concave portion 23, which is formed in a concave shape as viewed from the lighting unit 30 side (inside), for positioning the light source 31 and the light guide plate 32 is formed at the rear (opposite side to the visible side) of the supporting surface 22. A rear surface supporting portion 24 extending from the outer peripheral end surface portion 10p1 toward the outer peripheral end surface portion 10p3 of the electro-optical panel 10 is provided on the rear side (opposite side to the visible side) of the holding frame 21.

The holding tape 25 corresponding to the adhesive layer of the invention has at least a width from the outer peripheral end surface 10p of the electro-optical panel 10 to the outer peripheral end surface 32p of the light guide plate 32 that is the outer peripheral end surface of the lighting unit 30. Particularly, considering that the holding tape 25 is adhered to the outer peripheral end surface 10p and the outer peripheral end surface 32p in a production process, it is preferable that the holding tape 25 is a flexible tape formed of a resin material to allow the adhering work to be easily performed. As shown in FIG. 4, the holding tape 25 is configured to have a high light shielding property by laminating a white film 25a and a black film 25b. With such a configuration, light is reflected on an inner surface of the holding tape 25 by the white film 25a. Accordingly, it is possible to reuse outgoing light from the light guide plate 32 or the like, and it is possible to effectively prevent light from leaking out by the black film 25b. The light shielding property of the holding tape 25 is not limited to a laminated structure, and may be secured by a light reflective material such as an aluminum foil.

As shown in FIG. 2B, a ring-shaped light shielding tape 26 is adhered to a bottom surface 10*d* of the outer peripheral portion of the electro-optical panel 10. The light shielding tape 26 prevents outgoing light from the lighting unit 30 from passing a transparent area outside the light shielding film 17 provided at the outer periphery of the electro-optical panel 10 and leaking toward the visible side.

As shown in FIG. 4, the holding tape 25 is preferably an adhesive tape provided with an adhesive layer 25*s* on the inner surface thereof. However, even when the holding tape 25 is not formed of an adhesive tape, the same configuration can be applied by causing the holding tape 25 to adhere to the outer peripheral end surfaces 10*p* and 32*p* through an adhesive agent.

One end portion of the light-shielding holding tape 25 is adhered to one end surface 21*s* of the holding frame 21, and subsequently is adhered to the outer peripheral end surface portions 10*p*2 and 32*p*2, the outer peripheral end surface portions 10*p*3 and 32*p*3, and the outer peripheral end surface portions 10*p*4 and 32*p*4, along the outer peripheries of the electro-optical panel 10 and the light guide plate 32. The other end portion is adhered to the other end surface 21*t* of the holding frame 21.

In the frame body 20 configured as described above, the other outer peripheral end surface portions 10*p*2, 10*p*3, and 10*p*4 of the electro-optical panel 10, the outer peripheral end surface portion 10*p*1 of which is positioned at the holding frame 21, and the other outer peripheral end surface portions 32*p*2, 32*p*3, and 32*p*4 of the light guide plate 32, the outer peripheral end surface portion 32*p*1 (light incident surface 32*a*) of which is positioned at the holding frame 21 are adhered and fixed in a thickness direction and in a direction along the periphery by the common holding tape 25. In this case, the reflective sheet 33 is also adhered and fixed by the holding tape 25. However, when the adhering area of the end surface of the reflective sheet 33 is small and thus the holding effect is small, the holding tape 25 may be adhered to the light guide plate 32 and the reflective sheet 33 may be adhered to the rear surface (rear surface opposite to the light outgoing surface 32*b*) of the light guide plate 32.

In the embodiment, as described above, all the outer peripheral end surfaces of the electro-optical panel 10 and the lighting unit 30 are adhered to the holding tape 25, and thus the electro-optical panel 10 and the lighting unit 32 are positioned and held with respect to each other. Accordingly, it is possible to reduce the width extending outward from the display area 10A particularly on the sides of the outer peripheral end surface portions 10*p*2 and 32*p*2, the outer peripheral end surface portions 10*p*3 and 32*p*3, and the outer peripheral end surface portions 10*p*4 and 32*p*4. Therefore, it is possible to reduce the size of the outward form of the product as the electro-optical device. In this case, the electro-optical panel 10 and the lighting unit 30 are reliably held and fixed by the holding tape 25 having a light shielding property, and light is reliably blocked between both of them (light is prevented from leaking).

The thickness of the holding tape 25 may vary according to the material and the laminated structure, and can be set in the range of 1 μm to 1 mm even including the thickness of the adhesive layer 25*s* or the adhesive agent, preferably about 5 to 500 μm, and more preferably about 10 to 100 μm, using a synthetic resin material.

In the embodiment, the holding tape 25 is adhered to the outer peripheral end surfaces 10*p* and 32*p* of the electro-optical panel 10 and the lighting unit 30 opposed to the holding frame 21, and thus the projection to the outer periphery of the frame is drastically reduced, as compared with the case of using a literally frame-shaped frame body surrounding the electro-optical panel 10 and the light guide plate 32 throughout substantially the whole periphery. In addition, the holding tape 25 has the width suitable for adhering all the outer peripheral end surfaces 10*p* and 32*p* of the electro-optical panel 10 and the lighting unit 30, and thus the electro-optical device can be held and fixed with sufficient rigidity in the thickness direction even when the holding tape 25 is formed of a thin and flexible material. Accordingly, it is possible to secure the holding rigidity as the frame body 20. In addition, the holding tape 25 has a light shielding property, and thus it is possible to secure a light shielding function of the device.

In the embodiment, the outer peripheral end surface portions 10*p*1 and 32*p*1 on one side of the electro-optical panel 10 and the lighting unit 30 are positioned and held by the holding frame 21 different from the holding tape 25, and thus it is possible to improve the rigidity of the whole frame body 20. In addition, it is possible to improve positional precision between the electro-optical panel 10 and the lighting unit 30 by using the holding frame 21. Moreover, there is no trouble even when the light source 31 is positioned and fixed or the electro-optical device is fixed in an electronic apparatus.

In this case, the holding frame 21 is provided with the rear surface supporting portion 24, and the rear surface supporting portion 24 supports the lighting unit 30 at the rear. Accordingly, it is possible to further improve the rigidity of the whole frame body 20. Specifically, the lighting unit 30 supported by the rear surface supporting portion 24 indirectly supports the electro-optical panel 10 through the holding tape 25, and thus supporting rigidity particularly in the thickness direction of the electro-optical panel 10 and the lighting unit 30 is drastically improved by the rear surface supporting portion 24. In addition, it is possible to further improve the rigidity and the positional precision of the frame body 20 by causing the holding tape 25 to adhere to the outer peripheral surface of the rear surface supporting portion 24.

Second Embodiment

Figure 5:
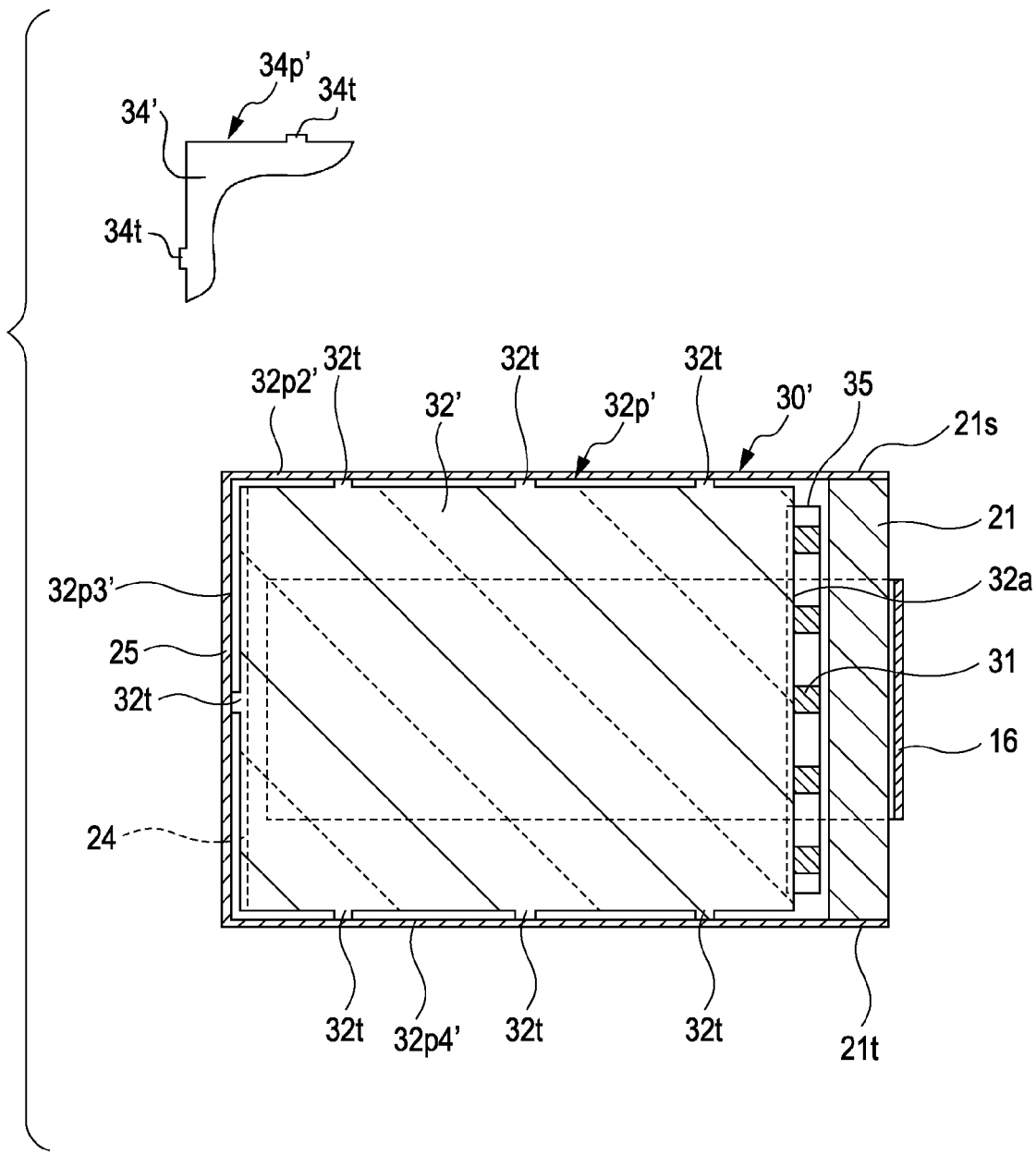
FIG. 5 is a transverse cross-sectional view of a second embodiment.

Next, a second embodiment according to the invention will be described with reference to FIG. 5. FIG. 5 is a transverse cross-sectional view of an accommodating part of a light unit 30' according to the second embodiment. In the embodiment, the same reference numerals and signs are given to the same parts as the parts described in the former embodiment, and the description thereof is omitted.

The lighting unit 30' may be disposed appropriately to overlap a lighting range thereof with the display area 10A of the electro-optical panel 10. Generally, the positional precision in the plane direction with respect to the electro-optical panel 10 is not necessarily increased so much as to be in microns. On the other hand, the main materials of the lighting unit 30 are synthetic resin (the light guide plate 32 is generally formed of acryl resin, poly carbonate, etc.) as compared with the main materials (e.g., glass) of the electro-optical panel 10, and thus to some extent positional deviation may be caused by thermal expansion. Accordingly, it is necessary to counterbalance the positional deviation, and it is necessary to counterbalance to some extent external stress applied at the time of installing the lighting unit in the inside or the like of electronic apparatus.

In the embodiment, in consideration of the above-described necessity, the positional deviation caused by the thermal expansion or the external stress is allowed by reducing an outer peripheral end surface 32*p*' of a light guide plate 32' of the lighting unit 30', particularly, an area adhering to outer peripheral end surface portions 32p2', 32p3', and 32p4' adhered to the holding tape 25.

That is, as shown in FIG. 5, a protrusion 32t is formed at the outer peripheral end surface 32p' (outer peripheral end surface portions 32p2', 32p3', and 32p4'), and the protrusion 32t is adhered to the holding tape 25. However, basically, the other parts except for the protrusion 32t are not adhered. The shape of a leading end of the protrusion 32t is random, but the leading end of the protrusion 32t is formed in a platform shape having a length in some extent along a periphery in the shown example. With such a configuration, adhesion to the holding tape 25 is performed only by the leading end of the protrusion 32t, and thus it is possible to counterbalance to some extent the positional deviation caused by the thermal expansion or the external stress. Accordingly, it is possible to prevent the holding tape 25 from becoming largely twisted and there is an influence on the holding and fixing state with respect to the electro-optical panel 10.

In this case, as shown in the example, it is preferable that a plurality of protrusions 32t are provided to take the whole balance, and it is preferable that the plurality of protrusions 32t are dispersedly disposed along the outer peripheral end surface 32p'.

The structure of the outer peripheral end surface 32p' of the light guide plate 32' can be similarly applied to the reflective sheet 33 or the optical sheet 34. For example, a configuration example of an optical sheet 34' is shown in FIG. 5. Also in case of the optical sheet 34', the protrusion 34t is provided at an outer edge 34p' in the same manner, thereby counterbalancing the positional deviation caused by the thermal expansion or the external stress. Particularly, the reflective sheet 33 or the optical sheet 34 is extremely thin by about several tens micron. Accordingly, when the positional deviation in a plane direction cannot be counterbalanced, they may be curved. For this reason, the above-described structure is very important. However, the reflective sheet 33 or the optical sheet 34 may be adhered to the light guide plate 32 or may be disposed movably in the plane direction in a completely free state, without adhering to the holding tape 25.

Third Embodiment

Figure 6A:
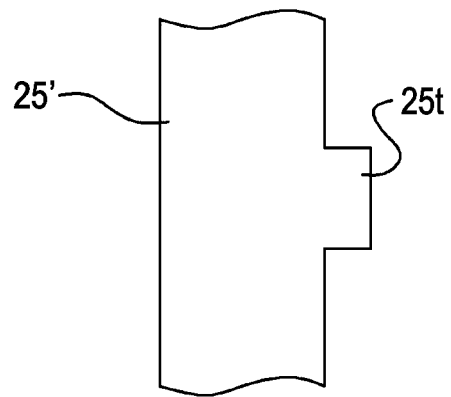
FIG. 6A is a partially enlarged plan view of a holding tape according to a third embodiment.
Figure 6B:
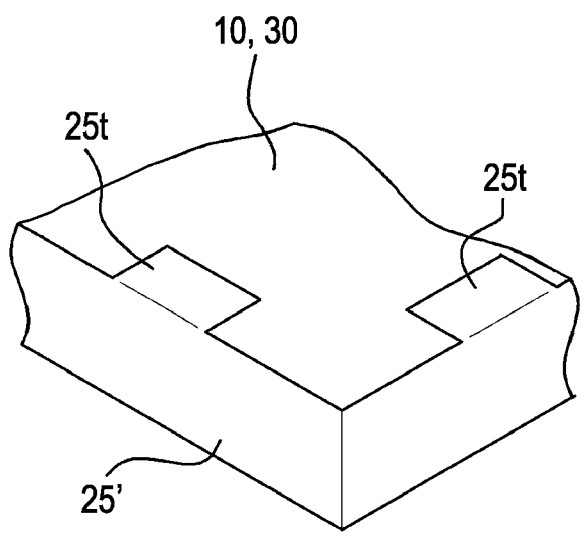
FIG. 6B is a schematic partial perspective view of the third embodiment.
Figure 6C:
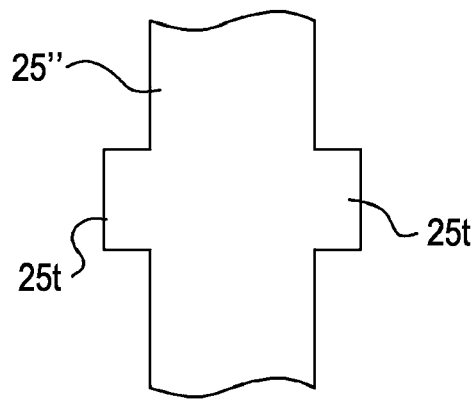
FIG. 6C is a partially enlarged plan view of a holding tape according to a modified example.

Next, a third embodiment according to the invention will be described with reference to FIG. 6A, FIG. 6B, and FIG. 6C. FIG. 6A is a partial plan view of a holding tape 25' according to the third embodiment, FIG. 6B is a partial perspective view illustrating an aspect of using the holding tape 25', and FIG. 6C is a partial plan view of another holding tape 25". In the embodiment, the same reference numerals and signs are given to the same parts as the parts described in the former embodiment, and the description thereof is omitted.

In the embodiment, as shown in FIG. 6A, a protruding piece 25t protruding in a width direction is formed on a width-direction side of the holding tape 25'. As shown in FIG. 6B, when the holding tape 25' is adhered to the outer peripheral end surface of the electro-optical panel 10 or the lighting unit 30, the protruding piece 25t is folded back on the front surface of the visible side of the electro-optical panel 10 or the rear surface of the lighting unit 30 opposite to the visible side, and the protruding piece 25t is adhered onto the front surface or the rear surface. With such a configuration, it is possible to improve the rigidity of the whole frame body 20, as compared with the former embodiment in which the electro-optical device is adhered only in the thickness direction. In this case, it is more preferable that a plurality of protruding pieces 25t are dispersedly provided along the outer peripheral end surface to which the holding tape 25' is adhered.

The protruding piece 25t is formed at one side edge of the holding tape 25'. However, as shown in FIG. 6C, the protruding pieces 25t are folded and adhered in both directions of the front surface of the electro-optical panel 10 and the rear surface of the lighting unit 30, using a holding tape 25" having the protruding pieces 25t formed on both side edges in the width direction. Accordingly, it is possible to further improve the rigidity of the frame body 20.

Fourth Embodiment

Figure 7:
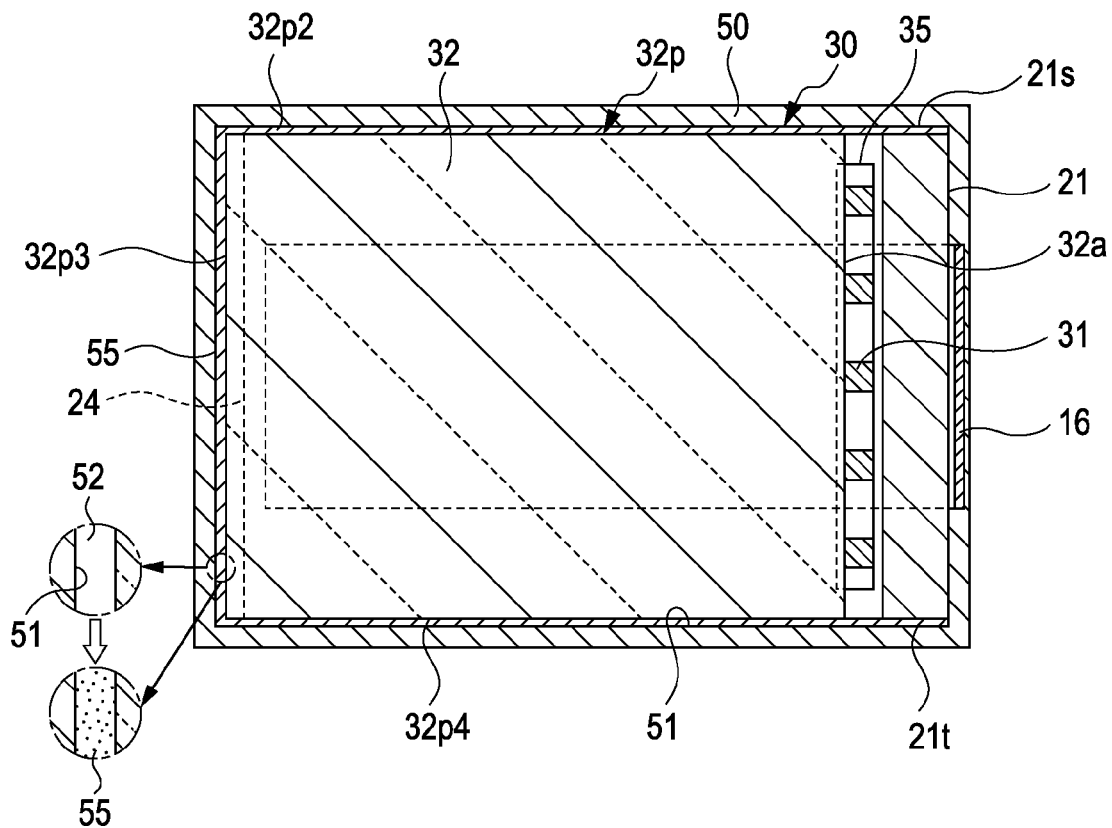
FIG. 7 is a transverse cross-sectional view illustrating a process of producing a fourth embodiment.

Next, a fourth embodiment according to the invention will be described with reference to FIG. 7. FIG. 7 is a transverse cross-sectional view illustrating a shape of accommodating the electro-optical panel 10 and the lighting unit 30 in a frame 50 at the time of producing the electro-optical device. In the embodiment, the same reference numerals and signs are given to the same parts as the parts described in the former embodiment, and the description thereof is omitted.

In the embodiment, the whole of the same electro-optical panel 10 and lighting unit 30 described in the first embodiment is accommodated in the frame 50 with the electro-optical panel 10 and the lighting unit 30 positioned by the holding frame 21. In this case, a gap 52 is formed between the outer peripheral end surfaces of the electro-optical panel 10 and the lighting unit 30 and an inner surface 51 of the frame 50, and the gap 52 is basically configured to occupy the same space as the holding tape 25 according to the first embodiment.

In the state shown in FIG. 7, a non-hardened adhesive agent is allowed to flow into a space between the inner surface 51 of the frame 50; and the electro-optical panel 10, the lighting unit 30, and the holding frame 21, and then the adhesive agent is hardened, thereby forming an adhesive agent layer 55 constituting the adhesive layer according to the invention in the same manner as the case of the holding tape 25 according to the first embodiment. The adhesive agent layer 55 is adhered to the electro-optical panel 10, the lighting unit 30, and the holding frame 21 in the same manner as the case of the holding tape 25.

Herein, the adhesive agent has a light shielding property by dispersing a fine filling material such as a carbon filler in an adhesive base material. As the adhesive agent in this case, various adhesive agents such as a thermosetting adhesive agent, a volatile adhesive agent, and a 2-liquid hardening adhesive agent may be used. However, light is hardly incident by the filling material, and thus it is preferable that the adhesive agent is not a light-hardening (violet-hardening) adhesive agent. For example, a denatured silicon-based adhesive agent may be used.

In the embodiment, a production process is changed. However, as a result, the same configuration as that of the first embodiment is obtained, and thus it is possible to obtain the same effect described above.

In the embodiment, the adhesive agent layer formed of one-body adhesive agent is provided instead of the holding tape, but the forming method is not limited to the method of using the frame 50 as described above. For example, a method of applying the adhesive agent in the range from the outer peripheral end surface of the electro-optical panel 10 to the outer peripheral end surface of the lighting unit 30 may be used. Such an adhesive agent may be applied using a dispenser, a spray gun, or the like.

Fifth Embodiment

Figure 8:
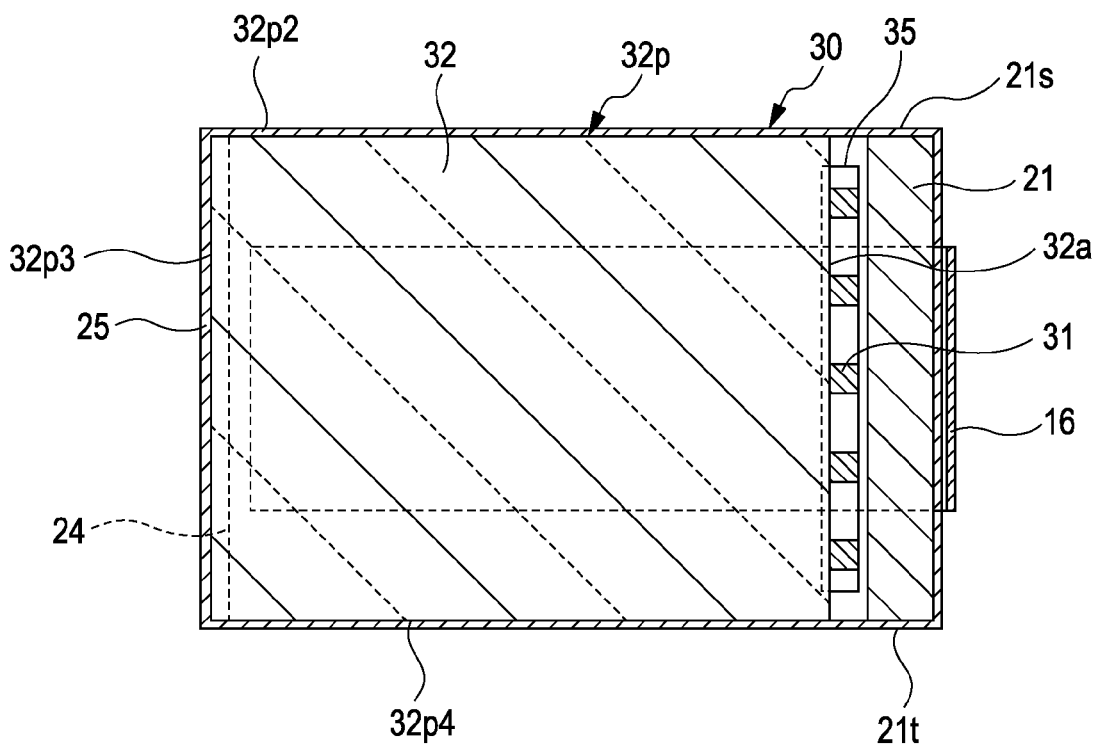
FIG. 8 is a transverse cross-sectional view of a fifth embodiment.

Next, a fifth embodiment according to the invention will be described with reference to FIG. 8. FIG. 8 is a transverse cross-sectional view of another electro-optical device. In the embodiment, the same reference numerals and signs are given to the same parts as the parts described in the former embodiment, and the description thereof is omitted.

The embodiment is different from the former embodiments in that the holding tape 25 is adhered to surround the whole periphery of the outer peripheral end surface of the holding frame 21 and the outer peripheral end surfaces of the electro-optical panel 10 and the lighting unit 30. With such a configuration, the adhering area between the holding frame 21 and the holding tape 25 is increased, and thus it is possible to further improve the rigidity of the frame body 20.

Sixth Embodiment

Figure 9:
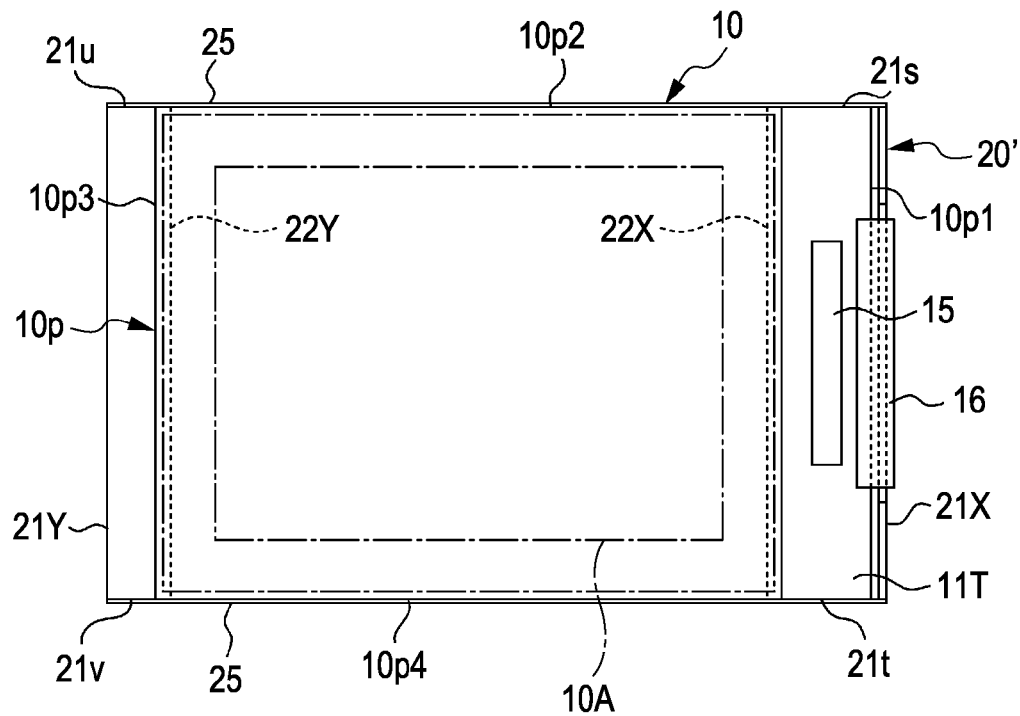
FIG. 9 is a plan view of a sixth embodiment.

Next, a sixth embodiment according to the invention will be described with reference to FIG. 9. FIG. 9 is a plan view of another electro-optical device. In the embodiment, the same reference numerals and signs are given to the same parts as the parts described in the former embodiment, and the description thereof is omitted.

The embodiment is different from the former embodiments in that two frame members are provided such as a first holding frame 21X formed along one side of the electro-optical panel 10 and the lighting unit 30, and a second holding frame 21Y formed along the other side (side opposed to the side on which the first holding frame 21X is formed).

The first holding frame 21X is formed on the side of the substrate projecting portion 11T of the electro-optical panel 10 and the light source 31 of the lighting unit 30 in the same manner as the holding frame 21 according to the above-described embodiments, and positions the electro-optical panel 10 and the lighting unit 30 (the light source 31 and the light guide plate 32). The second holding frame 21Y positions the electro-optical panel 10 and the lighting unit 30 (light guide plate 32) from the opposite side to the holding frame 21X. For example, the first holding frame 21X and the second holding frame 21Y are provided with supporting surfaces 22X and 22Y for supporting the outer peripheral portion of the electro-optical panel 10 from the rear side (opposite side to the visible side), respectively.

A holding tape 25 is adhered to all of one end surface 21s of the first holding frame 21X and one end surface 21u of the second holding frame 21Y, and is adhered to the outer peripheral end surface portion 10p2 of the electro-optical panel 10 and the outer peripheral end surface portion 32p2 (not shown) of the light guide plate 32 provided therebetween. Another holding tape 25 is adhered to all of the other end surface 21t of the first holding frame 21X and the other end surface 21v of the second holding frame 21Y, and is adhered to the outer peripheral end surface portion 10p4 of the electro-optical panel 10 and the outer peripheral end surface portion 32p4 (not shown) of the light guide plate 32 provided therebetween. The holding tapes 25 may be formed of a one-body holding tape as shown in the fifth embodiment, and may be formed as two separate holding tapes.

With such a configuration, it is possible to further improve the rigidity of a frame body 20', and it is possible to improve the positional precision of the electro-optical panel 10 and the lighting unit 30. In addition, the holding tape 25 adheres two opposed sides of the electro-optical panel 10 and the lighting unit 30, and thus it is possible to reduce the outward projection toward the outside of the direction of the two sides.

Seventh Embodiment

Figure 10:
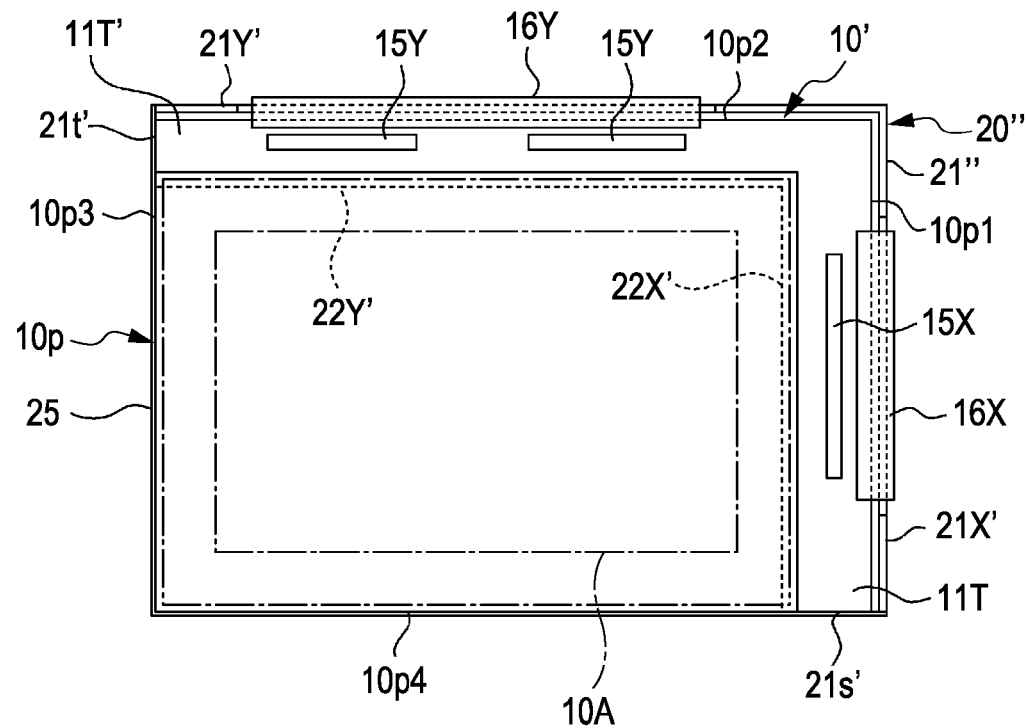
FIG. 10 is a plan view of a seventh embodiment.

A seventh embodiment according to the invention will be described with reference to FIG. 10. FIG. 10 is a plan view of another electro-optical device. In the embodiment, the same reference numerals and signs are given to the same parts as the parts described in the former embodiment, and the description thereof is omitted.

In the embodiment, a holding frame 21" has a first holding portion 21X' and a second holding portion 21Y'. The first holding portion 21X' is disposed along the side of the substrate projecting portion 11T in the same manner as the case of the former embodiments, and the second holding portion 21Y' is disposed along a side adjacent to the side on which the first holding portion 21X' is disposed. Accordingly, the holing frame 21" overall has an L-shaped plane shape.

An electro-optical panel 10' according to the embodiment has a substrate projecting portion 11T' adjacent to the substrate projecting portion 11T provided on the side on which the first holding portion 21X' is disposed, and the substrate projecting portion 11T' is provided on the side on which the second holding portion 21Y' is disposed. The substrate projecting portions 11T and 11T' are formed in an L shape. A driving circuit 15X having the configuration described above is mounted on the substrate projecting portion 11T, and the another driving circuit 15Y is mounted on the substrate projecting portion 11T'.

In the embodiment, the first holding portion 21X' is provided with a supporting surface 22X', and the second holding portion 21Y' is provided with a supporting surface 22Y'. The L-shaped supporting surfaces 22X' and 22Y' support a part along a side adjacent to an outer peripheral portion of the electro-optical panel 10', from the rear thereof.

In the embodiment, it is possible to improve the rigidity of a frame body 20", and it is possible to improve the positional precision of the electro-optical panel 10' and the lighting unit 30 (not shown). In addition, it is possible to reduce the projection toward the outside on two sides other than the side on which the holding frame 21" is disposed.

In the sixth embodiment and the seventh embodiment, the holding frame is disposed on two sides of the outer periphery of the electro-optical panel and the lighting unit, and the other two sides are adhered to the holding tape 25. However, for example, the holding frame may be disposed on three sides of the outer periphery, and the other side may be adhered to the holding tape 25.

The frame body 20 is provided with the holding frame 21, the holding frame 21 positions the one-side end portions of the electro-optical panel 10 and the lighting unit 30 with respect to each other. However, the electro-optical panel 10 and the lighting unit 30 may be positioned with respect to each other by adhering the holding tape 25 throughout the whole periphery of the electro-optical panel 10 and the lighting unit 30, without using the holding frame 21. However, in this case, it is necessary to provide the lighting unit 30 with another member used for positioning the light source 31 and the light guide plate 32.

Electronic Apparatus

Figure 11:
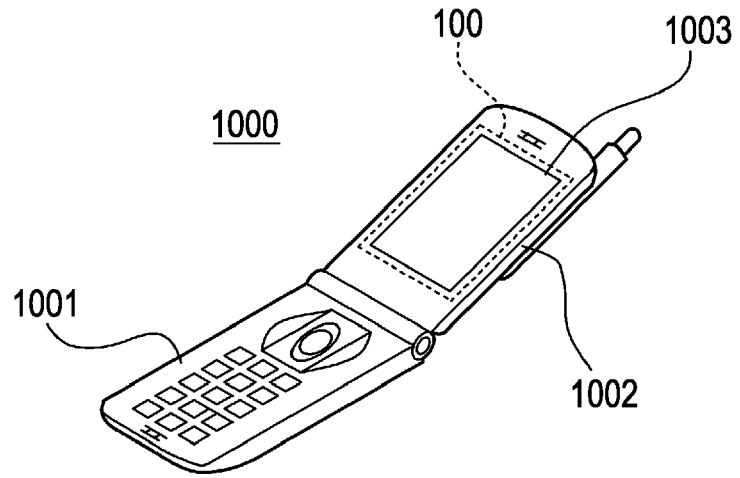
FIG. 11 is a schematic perspective view of an electronic apparatus.

Finally, an electronic apparatus 1000 provided with the electro-optical device 100 configured as described above in the embodiments will be described with reference to FIG. 11 and FIG. 12. FIG. 11 is a perspective view illustrating outward appearance of the electronic apparatus 1000.

The electronic apparatus 1000 has a main body 1001 and a display unit 1002, and the main body 1001 is provided with an operation unit such as operation buttons, and is provided with a control device therein. The display unit 1002 is provided with a display screen 1003, and a predetermined display image is formed on the display screen 1003 by the electro-optical device 100 disposed in the display unit 1002. The electronic apparatus 1000 shown in FIG. 11 shows an example of constituting a mobile phone, but the electronic apparatus 1000 according to the invention is not limited thereto. For example, the electronic apparatus 1000 can be applied to a mobile information terminal, an electronic watch, and other various apparatuses.

Figure 12:
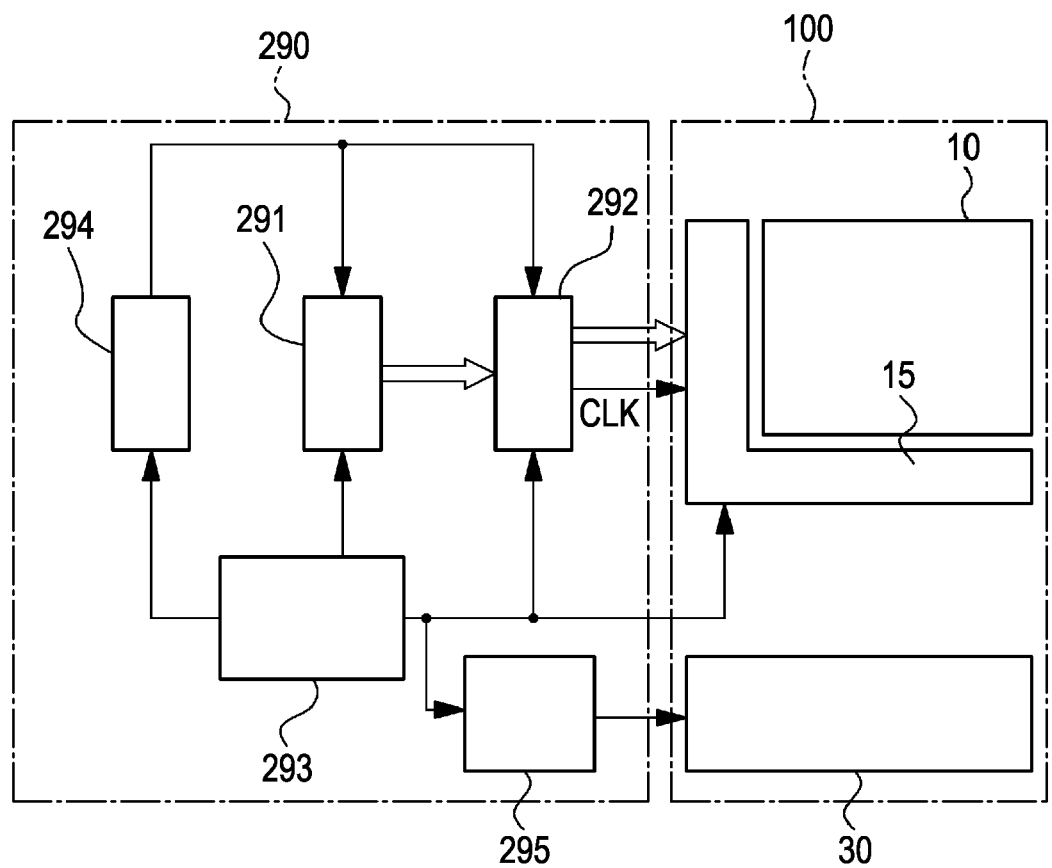
FIG. 12 is a schematic block diagram of a display control system of the electronic apparatus.

FIG. 12 is a schematic block diagram illustrating a configuration of a control system of the electronic apparatus 1000. The electronic apparatus 1000 has a display control circuit 290 including a display information output source 291, a display information processing circuit 292, a power supply circuit 293, and a timing generator 294, a light source control circuit 295 supplying electric power to the lighting unit 30. The electro-optical device 100 is provided with the electro-optical panel 10 having the above-described configuration, the driving circuit 15 (15X, 15Y) for driving the electro-optical panel 10, and the lighting unit 30 as a back light. In addition to the above-described aspect, the driving circuit 15 may be formed of a circuit pattern or electronic components formed on the substrate surface of the electro-optical panel 10, or a circuit pattern or an IC chip mounted on a circuit board electrically connected to the electro-optical panel 10.

The display information output source 291 is provided with a memory formed of ROM (Read Only Memory), RAM (Random Access Memory) or the like, a storage unit formed of a magnetic recording disk, an optical recording disk, or the like, a synchronizing circuit for synchronizing and outputting digital image signals. The display information output source 291 supplies display information to the display information processing circuit 292 in a form of an image signal or the like with a predetermined format, on the basis of various clock signals generated by the timing generator 294.

The display information processing circuit 292 is provided with the known various circuits such as a serial-parallel conversion circuit, an amplification-inversion circuit, a rotation circuit, a gamma correction circuit, and a clamp circuit. The display information processing circuit 292 performs a process of input display information, and supplies the image information with a clock signal CLK to the driving circuit 15. The driving circuit 15 includes a scanning line driving circuit, a signal line driving circuit, and a test circuit. The power supply circuit 293 supplies a predetermined voltage to each of the above-described constituent elements.

The light source control circuit 295 supplies electric power to the light source of the lighting unit 30 on the basis of the voltage supplied from the power supply circuit 293, and controls lighting of the light source and brightness on the basis of a predetermined control signal.

The electro-optical device and the electronic apparatus according to the invention are not limited to the above-described examples, and may be variously modified within the scope of the invention. For example, the characteristics of the embodiments may be appropriately combined with one another. Accordingly, as an example, the configurations and the modified examples of the first embodiment to the third embodiment may be applied to the configurations and the modified examples of the fifth embodiment to the seventh embodiment. In addition, the adhesive agent layer according to the fourth embodiment may be used instead of the holding tape of the other embodiment.

In the embodiment, the lighting unit 30 is used as a back light disposed at the rear of the electro-optical panel 10, but may be used as a front light disposed on the visible side of the electro-optical panel 10 as the lighting unit.

The entire disclosure of Japanese Patent Application No. 2008-225601, field Sep. 3, 2008 is expressly incorporated by reference herein.

What is claimed is:

1. An electro-optical device comprising:
   an electro-optical panel;
   a lighting unit that is disposed to overlap with the electro-optical panel in a plan view and that irradiates the electro-optical panel; and
   a frame-shaped holding member that has an adhesive layer for holding the electro-optical panel and the lighting unit,
   wherein the holding member is provided at an outer peripheral end surface of the electro-optical panel and an outer peripheral end surface of the lighting unit, and fixes the electro-optical panel and the lighting unit.

2. The electro-optical device according to claim 1, wherein the adhesive layer is disposed from the outer peripheral end surface of the electro-optical panel to the outer peripheral end surface of the lighting unit.

3. The electro-optical device according to claim 2, wherein the adhesive layer is formed of a tape.

4. The electro-optical device according to claim 2, wherein the holding member includes the adhesive layer and a holding frame constituting a part of a frame.

5. The electro-optical device according to claim 4, wherein the adhesive layer is formed of a tape, and the tape is disposed from an end surface of the holding frame to the outer peripheral end surface of the electro-optical panel and the outer peripheral end surface of the lighting unit.

6. The electro-optical device according to claim 2, wherein the lighting unit includes a light guide plate and an optical sheet disposed between the light guide plate and the electro-optical panel, the adhesive layer is disposed from the outer peripheral end surface of the electro-optical panel to an outer peripheral end surface of the optical sheet.

7. An electronic apparatus comprising:
   the electro-optical device according to claim 1; and
   a control unit for controlling the electro-optical device.

* * * * *